United States Patent
Kiesel et al.

(10) Patent No.: US 6,312,633 B1
(45) Date of Patent: Nov. 6, 2001

(54) METHOD OF PRODUCING A SLUSH MEMBRANE WITH A PREDETERMINED BREAKING LINE FOR AN AIRBAG FLAP

(75) Inventors: Gerd Henning Kiesel, Garbsen; Walter André, Hannover, both of (DE)

(73) Assignee: Benecke Kaliko AG, Hannover (DE)

( * ) Notice: Subject to any disclaimer, the term of this patent is extended or adjusted under 35 U.S.C. 154(b) by 0 days.

(21) Appl. No.: 09/120,831

(22) Filed: Jul. 22, 1998

(30) Foreign Application Priority Data

Jul. 24, 1997 (DE) ............................................. 197 31 776
Jul. 30, 1997 (DE) ............................................. 197 32 767

(51) Int. Cl.[7] ........................ B29C 33/42; B29C 41/04; B29C 41/18
(52) U.S. Cl. ...................... 264/125; 264/254; 264/302; 264/303; 264/311
(58) Field of Search .................... 264/125, 302, 264/303, 310, 311, 250, 251, 254; 425/130, 117, 425, 429, 435

(56) References Cited

U.S. PATENT DOCUMENTS

| | | | |
|---|---|---|---|
| 2,726,924 | * 12/1955 | Rumbold | 264/303 |
| 2,977,635 | * 4/1961 | Welch | 264/303 |
| 4,562,025 | * 12/1985 | Gray | 264/126 |
| 4,634,360 | * 1/1987 | Gray | 425/130 |
| 4,780,345 | 10/1988 | Gray . | |
| 4,880,588 | * 11/1989 | Brault et al. | 264/163 |
| 4,894,004 | * 1/1990 | Brault | 425/435 |
| 4,938,906 | * 7/1990 | Brault | 264/163 |
| 4,992,037 | * 2/1991 | Hwang | 425/575 |
| 5,021,213 | * 6/1991 | Nishio et al. | 264/125 |
| 5,093,066 | * 3/1992 | Batchelder et al. | 264/245 |
| 5,222,760 | * 6/1993 | Rafferty | 280/728 |
| 5,225,214 | * 7/1993 | Filion | 425/434 |
| 5,262,108 | 11/1993 | Minke et al. . | |
| 5,288,103 | * 2/1994 | Parker et al. | 428/217 |
| 5,316,715 | * 5/1994 | Gray | 264/245 |
| 5,443,777 | * 8/1995 | Mills | 264/255 |
| 5,452,913 | * 9/1995 | Hansen et al. | 280/732 |
| 5,484,273 | * 1/1996 | Parker et al. | 425/112 |
| 5,525,284 | * 6/1996 | Grimmer | 264/311 |
| 5,567,375 | * 10/1996 | Filion et al. | 264/251 |
| 5,618,485 | * 4/1997 | Gajewski | 264/255 |
| 5,863,064 | * 1/1999 | Rheinlander et al. | 280/732 |
| 5,911,938 | * 6/1999 | El et al. | 264/261 |
| 5,922,256 | * 7/1999 | Gallagher et al. | 264/302 |
| 5,932,163 | * 8/1999 | Ashley | 264/311 |
| 6,019,590 | * 2/2000 | McNally | 264/303 |

FOREIGN PATENT DOCUMENTS

| | | |
|---|---|---|
| 8301053 | 11/1996 | (JP) . |
| 9099447 | 4/1997 | (JP) . |

OTHER PUBLICATIONS

*English Abstract of JP8301053.
*English Abstract of JP9099447.
*English Abstract of DE4029254.

* cited by examiner

*Primary Examiner*—Angela Ortiz
(74) *Attorney, Agent, or Firm*—Reed Smith LLP

(57) ABSTRACT

A method of producing dashboards, door or side trim panels for motor vehicles with a predetermined breaking line for an airbag flap is described. To accomplish this, slush material is introduced into a mold which can be heated to a molding temperature and determines the shape of the slush membrane, where the slush material is distributed and deposited on the heated mold surface by rotating the mold and is then sintered and gelled. After cooling the mold, the slush membrane is removed from the mold by unmolding. To create a predetermined breaking line, a mold having a divider on its mold surface at the location of the predetermined breaking line to be created is used. By controlled rotation and/or positioning of the mold while applying the powder and/or gelling the slush material, a reduction in the layer thickness of the slush material to an extent that establishes a predetermined breaking line is achieved.

7 Claims, 1 Drawing Sheet

METHOD OF PRODUCING A SLUSH MEMBRANE WITH A PREDETERMINED BREAKING LINE FOR AN AIRBAG FLAP

BACKGROUND OF THE INVENTION a) Field of the Invention

The present invention concerns a method of producing dashboards, door or side trim panels for motor vehicles with a predetermined breaking line for an airbag as well as dashboards, door or side trim panels for motor vehicles from a slush membrane.

b) Description of the Related Art

It is known that the cover for an airbag in the dashboard of a motor vehicle can be designed as a separate flap with a hinge connection to the dashboard. This flap corresponds in appearance to a glove compartment door, but it is usually smaller, and it is opened from the inside when the propelling unit of the airbag is deployed. This flap is manufactured as a separate part. One problem here is that the decorative trim must be applied very carefully to the cover in a highly labor-intensive procedure, and it must be foamed to adhere well to it, so that parts of the airbag flap will not become detached in the explosive opening of the airbag and thus possibly injure the passenger. A disadvantage of designing the airbag flap as a separate part is the high cost of the individual flap and the difficulty of matching its color, finish and grain to the surrounding surface of the instrument panel.

There have been attempts to solve this problem by providing an integrated opening line for the airbag in the instrument panel without using a cover flap. The flap design here is achieved by punching or stamping the backing part out of sheet metal or by reducing the thickness of certain zones in the case of injection molded backings. When the propelling unit is deployed, the flap defined by the predetermined breaking line ruptures the foam and film enclosing the backing. To accomplish this, the thickness of the film must be reduced along the proposed tear line, namely by notches, cuts or grooves in the front and/or reverse sides.

If the thickness is reduced on the reverse side of the film, the result is an "invisible" airbag cover.

However, the technology for reducing the thickness of the film from its reverse side has not yet been developed to a mass production level. Attempts have been made in the past to achieve the reduction in thickness from the reverse side in the form of notching or grooving by using a laser, by producing a drawing cut or by stamping with a hot knife blade.

It may also be desirable for visual reasons to achieve a reduced thickness of the film from the visible side, i.e., from the grainy side. In this case, the predetermine breaking line in the form of a groove or notch serves to produce a visual effect. The predetermined breaking line is intentionally used here to distinctly emphasize the airbag flap by creating a shadow groove. Even with this method of creating a predetermined breaking line for an airbag flap, methods known in the past are labor-intensive and cost-intensive, because after manufacturing the actual film, the predetermined breaking lines must be created separately in the form of grooves or notches in the film using tools. This alters the grain and finish.

OBJECTS AND SUMMARY OF THE INVENTION

Therefore, the primary object of the present invention is to create a method of the type defined in the preamble, whereby a predetermined breaking line for an airbag flap is created in a single operation together with the creation of the film. Another object of the present invention is to create dashboards, door or side trim panels for motor vehicles from a slush membrane, where a predetermined breaking line for an airbag flap is produced.

These objects are achieved with a method of producing dashboard, door or side trim panels for motor vehicles with a predetermined breaking line for an airbag flap which comprises the steps of introducing slush material into a mold which can be heated to a molding temperature and which determines the shape of the slush membrane, distributing the slush material and depositing it on the heated mold surface by rotation of the mold, the distributed and deposited material being then sintered and gelled; after cooling the mold, removing the slush membrane from the mold by unmolding. To create the predetermined breaking line, a mold is used having a divider on its mold surface at the location of the predetermined breaking line to be created. The method further uses the step of controlling rotation and/or position of the mold during the application of the powder and/or gelation of the slush material. A reduction in layer thickness of the slush material to an extent that establishes a predetermined breaking line is achieved.

Further, in accordance with the invention, in a dashboard, door or side trim panels for motor vehicles made of a slush membrane, which is introduced into a mold that can be heated to the molding temperature and determines the shape of the slush material, which is distributed and deposited on the heated mold surface by rotating the mold, then is sintered and gelled and removed from the mold after cooling the mold, where a local reduction in the layer thickness of the slush material is achieved by means of a divider on the mold surface, an improvement comprises that the local reduction in layer thickness of the slush material is used as a predetermined breaking line for an airbag behind the dashboard, or side trim panels of the vehicle.

It has been found that a known slush method with additional modifications is suitable for achieving the objects proposed here, and slush membranes produced by this method having a local reduction in layer thickness of the slush material as the predetermined breaking line can be used for an airbag behind the dashboard, door or side trim panels.

In a method according to German Patent No. 4,029,254 C2, dividers are provided in a slush mold. With these dividers it is possible to achieve a reduced thickness in the membrane, which is sintered after a first slush process, so that a predetermined area of the membrane sintered initially can be separated from the remaining area there and then removed. In a second slush process using a powder of a different color, another membrane that is visible is formed in the removed area, and an invisible membrane is formed on the reverse side of the membrane sintered initially and left in the mold. This produces a sharp separation of two color areas of multi-colored slush membranes on the visible side.

With a two-colored slush membrane, the areas where the membrane sintered initially is visible are approximately twice as thick as the other areas. Due to the fact that another membrane is sintered onto the membrane sintered initially in the areas remaining in the mold, a curvature of the remaining membrane is formed at the dividers, although there is hardly any reduction in thickness. With the known method, the dividers serve to guide a parting-off tool which thermally separates the slush membrane by melting and thus makes it possible to remove the slush membrane in an area intended for a different color. The local reduction in thickness of the material due to the shaping effect of the divider is an unwanted side effect, but it was not necessary at all to achieve a mechanical reduction in thickness of the material to produce a predetermined breaking line because of the thermal separation of the areas.

In considering the possibilities for creating a predetermined breaking line, it has been found that the side effect derived from German Patent No. 4,029,254 C2 for producing areas of reduced material thickness by means of the known dividers can also be used in principle to create a defined predetermined breaking line for an airbag flap. To do so, it is necessary to produce a zone of reduced material thickness of the slush membrane through the design of the dividers and/or by the procedure during the entire slush process.

In a first embodiment of the invention, the height of the dividers is slightly smaller than the average thickness of the slush membrane. When the mold is rotated while the powder is being applied and/or during gelation, the slush material is distributed on the mold in such a way as to yield a mostly uniform flat surface on the side of the slush membrane facing away from the mold, even in the area of the dividers. The slush material tends to equalize the irregularities caused by the dividers. This creates a groove in the slush membrane, reducing the thickness of the material. When a divider has very steep sides and a pointed ridge, this yields a groove with a complementary shape, where the tearing performance of the predetermined breaking line is achieved due to the notching effect of the groove in addition to the reduced thickness of the material. In a second embodiment, the height of the dividers is greater than the average thickness of the slush membrane. When the mold is rotated during gelation in the slush process, the slush material is distributed on the mold in such a way that the dividers are also coated with slush material, and the contour of the dividers is reflected on the slush membrane. This is especially true of dividers with flat sides and a rounded ridge. In this embodiment, a shadow groove is formed on the side that will be visible later.

The layer thickness of the slush membrane over the ridge can be reduced in a controlled manner by a process control measure if the mold is rotated about an axis parallel to the divider while applying the powder to the mold, because then the powder does not adhere well to the ridge. In addition or as an alternative, the mold can also be positioned during gelation so that the ridge of the divider is pointing upward. In addition, the gelation time can be lengthened. Then material will run down from the ridge, so that the slush membrane becomes thinner over the ridge. The required material thickness for the predetermined breaking line of the airbag flap can thus be adjusted very accurately.

There are also possible options with a first high divider having sides with a shallow slope and a second small pointed divider placed on the ridge of the first divider. This leads to a combination of the properties of the two alternatives.

According to an alternative embodiment of the present invention, the sides of the divider may be smoother than the other areas of the mold.

Then the powder does not adhere so well to the sides of the divider that the layer thickness ultimately formed here can be further reduced.

The sides of the divider may also have a shallower taper toward the base than at the tip.

Depending on the thickness of the divider at its base, a more or less wide or narrow groove can be created; this can be utilized to adjust the width of a shadow groove. The artificial leather grain can also be preserved on the divider and thus on the subsequent shadow groove.

BRIEF DESCRIPTION OF THE DRAWINGS

The present invention is explained in greater detail below with reference to the figures, which show.

FURTHER DESCRIPTION OF THE PREFERRED EMBODIMENTS

FIGS. 1 through 4 show cross sections through partial areas of a mold 10 to which slush material 12 has been applied. The mold 10 has a divider 14. The mold 10 can be rotated about an axis parallel to the divider 14 or it can be positioned in a rotational position. In the diagram according to FIG. 1, the divider 14 is smaller than the average layer thickness of the slush membrane produced from the slush material 12. By rotating the mold 10 while applying the powder and during gelation, the slush material liquefies, forming a mostly flat level. Then the image of the divider 14 does not appear on the surface of the slush membrane opposite the mold 10. Thus a wedge-shaped groove is formed in the area of the divider 14, reducing the thickness of the material and forming a predetermined breaking line in the finished slush membrane. The dividers 14 in FIGS. 2 and 3 have different heights and shapes, but both are higher than the average layer thickness of the slush membrane formed from the slush material 12. In addition, the divider is rounded on its ridge. The image of the divider 14 is also formed on the surface of the slush membrane opposite the mold 10. To reduce the thickness of the material in the area of the divider 14, the mold 10 can be rotated while the powder is being applied. Then the slush material does not adhere well to the ridge of the divider 14. In addition, the mold may also be positioned during gelation so that the ridge of divider 14 is still pointing upward. Then slush material will run down from the divider 14 during gelation, resulting in a smaller layer thickness in the area of divider 14.

Figure 1:
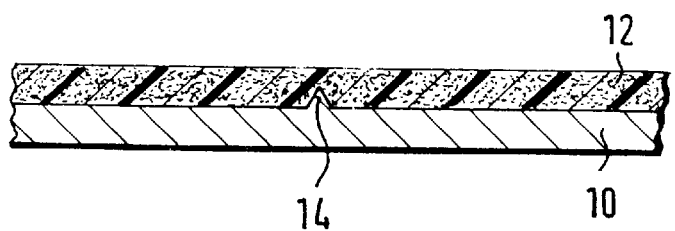
FIG. 1 illustrates a cross section through a partial area of a mold with a small, pointed divider, 4M.
Figure 2:
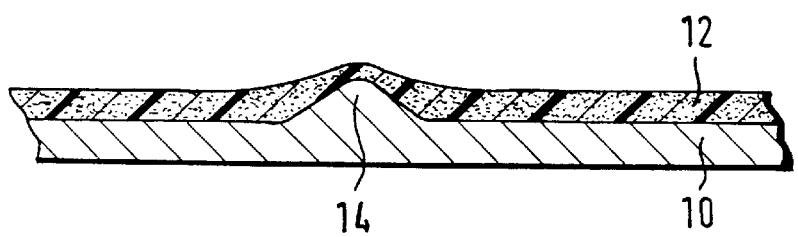
FIGS. 2 and 3 illustrate cross sections through a partial area of a mold with a high, rounded divider.
Figure 3:
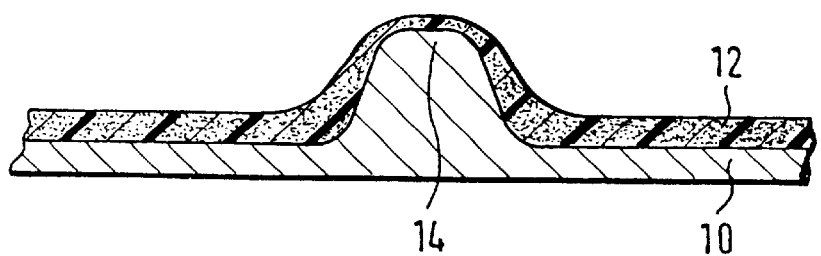
Figure 4:
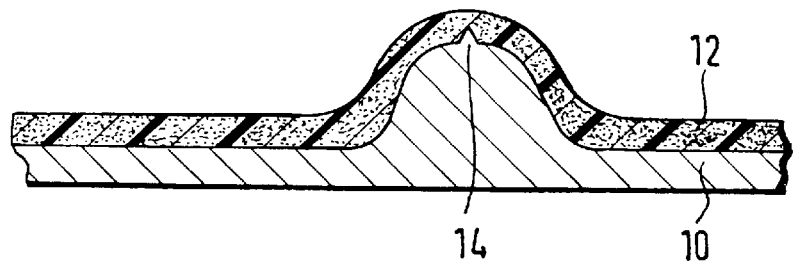
FIG. 4 illustrates a cross section through a partial area of a mold with a high, rounded divider and a small, pointed divider.

Finally, with the mold according to FIG. 4, a divider is provided, composed of a high, rounded divider and also a small, pointed divider placed on the ridge of the former. By rotating the mold 10 while applying the powder and gelling, the slush membrane thus formed follows the contour of the high divider, but a pointed groove is formed in the area of the small, pointed divider. Thus, a shadow groove with a locally precisely defined predetermined breaking line incorporated into it can be achieved with a mold having this design.

While the foregoing description and drawings represent the preferred embodiments of the present invention, it will be obvious to those skilled in the art that various changes and modifications may be made therein without departing from the true spirit and scope of the present invention.

What is claimed is:

1. A method of producing dashboard, door or side trim panels for motor vehicles with a predetermined breaking line for an airbag flap, comprising the steps of:

introducing a slush material into a mold which can be heated to a molding temperature and which determines the shape of a slush membrane to be formed;

distributing the slush material and depositing it on the heated mold surface by rotation of the mold;

said distributed and deposited slush material being then sintered and gelled;

after cooling the mold, removing the now formed slush membrane from the mold by unmolding;

wherein to create a predetermined breaking line in the formed slush membrane, at the step of introducing the slush material into the mold, using a mold having a divider on its mold surface at the location of the predetermined breaking line to be created;

controlling rotation and positioning of the mold during at least one of the application of a powder and gelation of the slush material, so that a reduction in layer thickness of the slush material to an extent that establishes a predetermined breaking line in the formed slush membrane for use as an airbag flap is achieved;

wherein the height of the divider is smaller than the average layer thickness of the slush material, and its shape is such that its sides enclose an angle smaller that 120 degrees and form a pointed ridge.

2. The method according to claim 1, wherein the height of the divider is greater than the average layer thickness of the slush material, and its shape is such that the sides enclose an angle greater than 70 degrees and form a rounded of flattened ridge, and the mold is rotated about an axis parallel or approximately parallel to the divider while the powder is being applied, and it is positioned during gelation in a rotational position where the ridge is pointing upward.

3. The method according to claim 1, wherein the sides of the divider are smoother than the other areas of the mold.

4. The method according to claim 1, wherein the sides of the divider have a shallower taper toward the base than at the tip.

5. A method of producing dashboard, door or side trim panels for motor vehicles with a predetermined breaking line for an airbag flap, comprising the steps of:

introducing a slush material into a mold which can be heated to a molding temperature and which determines the shape of a slush membrane to be formed;

distributing the slush material and depositing it on the heated mold surface by rotation of the mold;

said distributed and deposited slush material being then sintered and gelled;

after cooling the mold, removing the now formed slush membrane from the mold by unmolding;

wherein to create a predetermined breaking line in the formed slush membrane, at the step of introducing the slush material into the mold, using a mold having a divider on its mold surface at the location of the predetermined breaking line to be created;

controlling rotation and positioning of the mold during at least one of the application of a powder and gelation of the slush material, so that a reduction in layer thickness of the slush material to an extent that establishes a predetermined breaking line in the formed slush membrane for use as an airbag flap is achieved;

wherein the height of the divider is greater than the average layer thickness of the slush material, and its shape is such that the sides enclose an angle greater than 70 degrees and form a rounded off flattened ridge, and the mold is rotated about an axis parallel or approximately parallel to the divider while the powder is being applied, and it is positioned during gelation in a rotational position where the ridge is pointing upward.

6. The method according to claim 5, wherein the sides of the divider are smoother than the other areas of the mold.

7. The method according to claim 5, wherein the sides of the divider have a shallower taper toward the base than at the tip.

* * * * *